Figure 15:
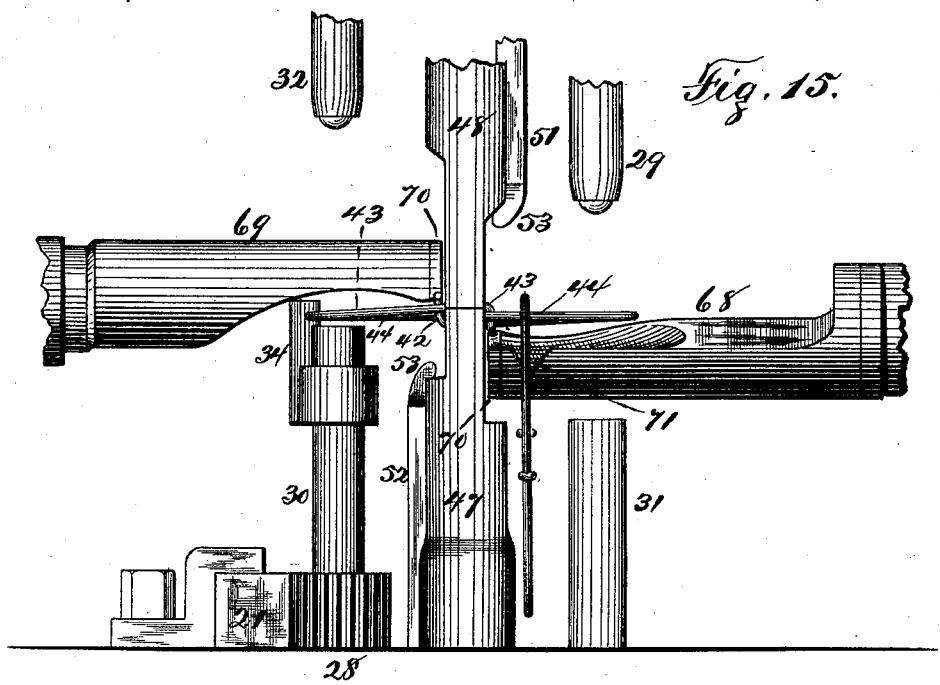

(No Model.) 8 Sheets—Sheet 1.
F. F. ELLIS.
CHAIN MAKING MACHINE.
No. 484,909. Patented Oct. 25, 1892.
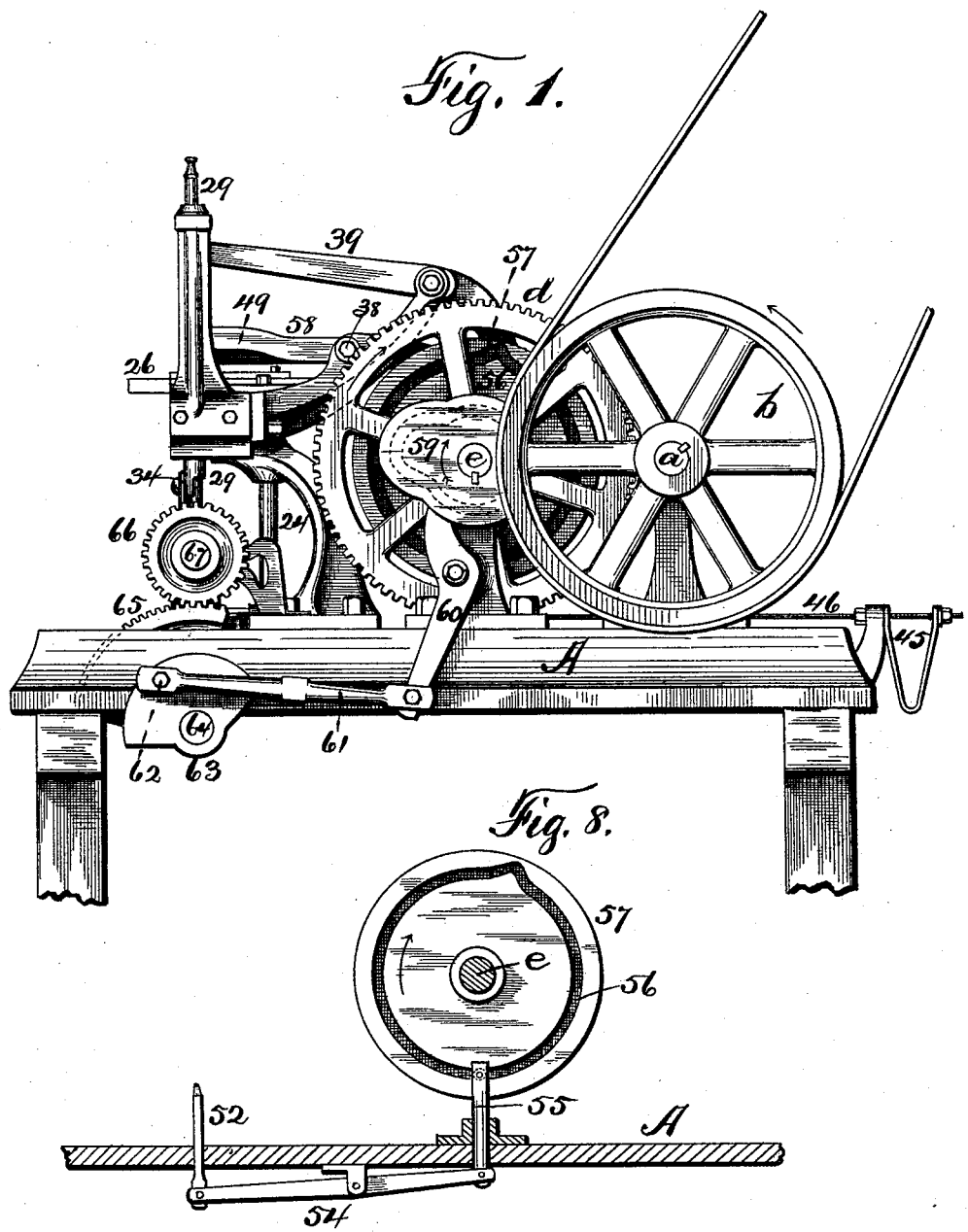
WITNESSES:
H. A. Carhart
H. E. Bates
INVENTOR,
Ferrand F. Ellis
BY
Smith & Denison
his ATTORNEYS

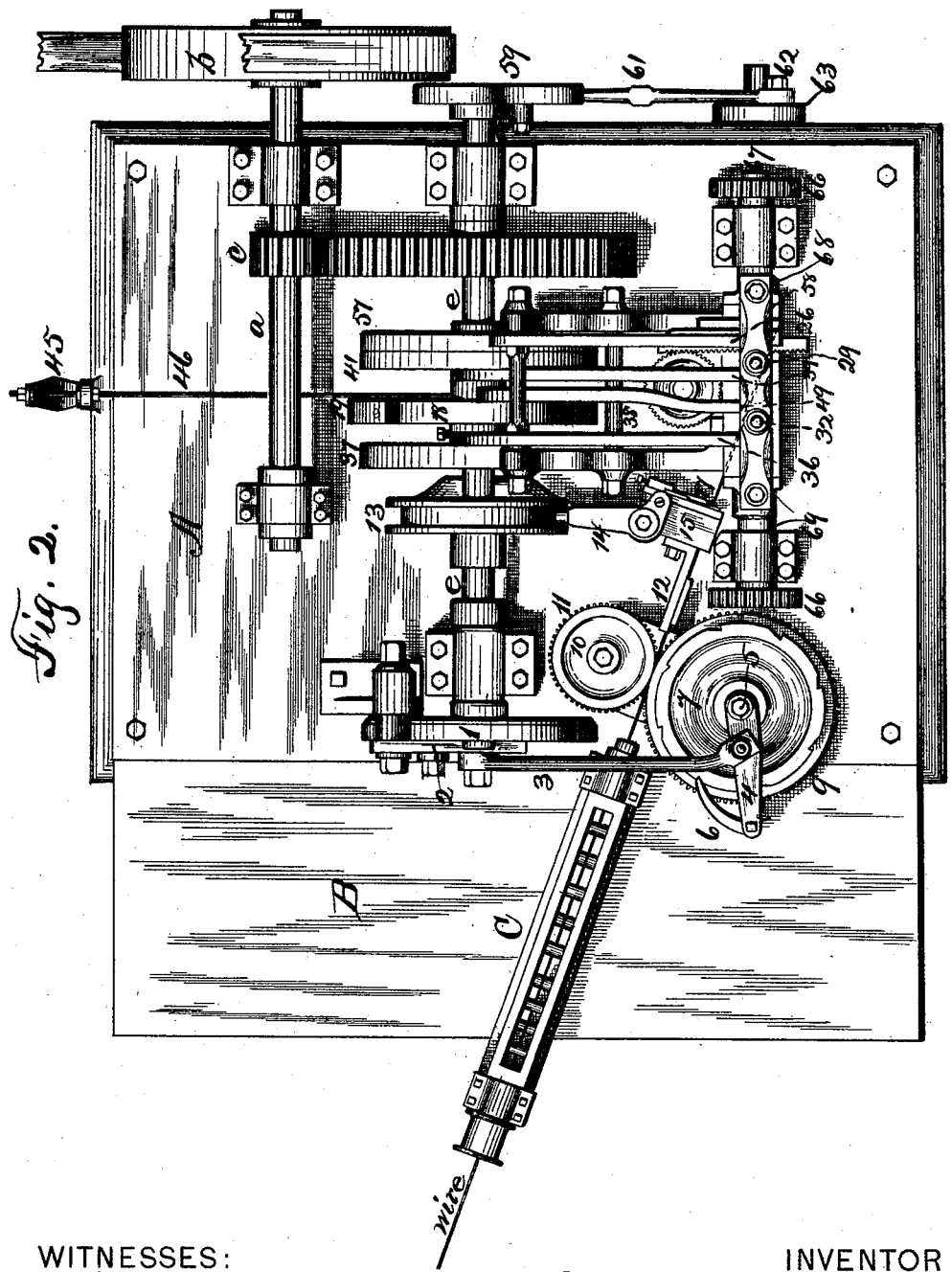

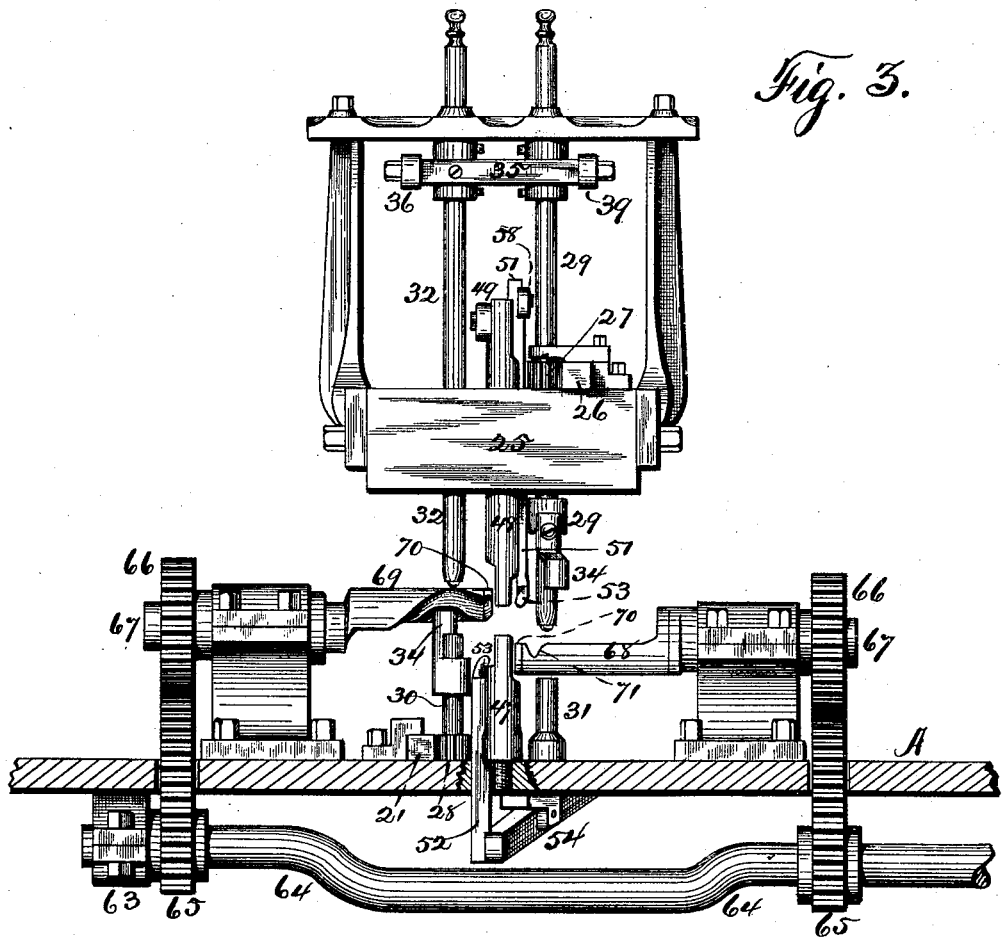

(No Model.) 8 Sheets—Sheet 4.
F. F. ELLIS.
CHAIN MAKING MACHINE.
No. 484,909. Patented Oct. 25, 1892.
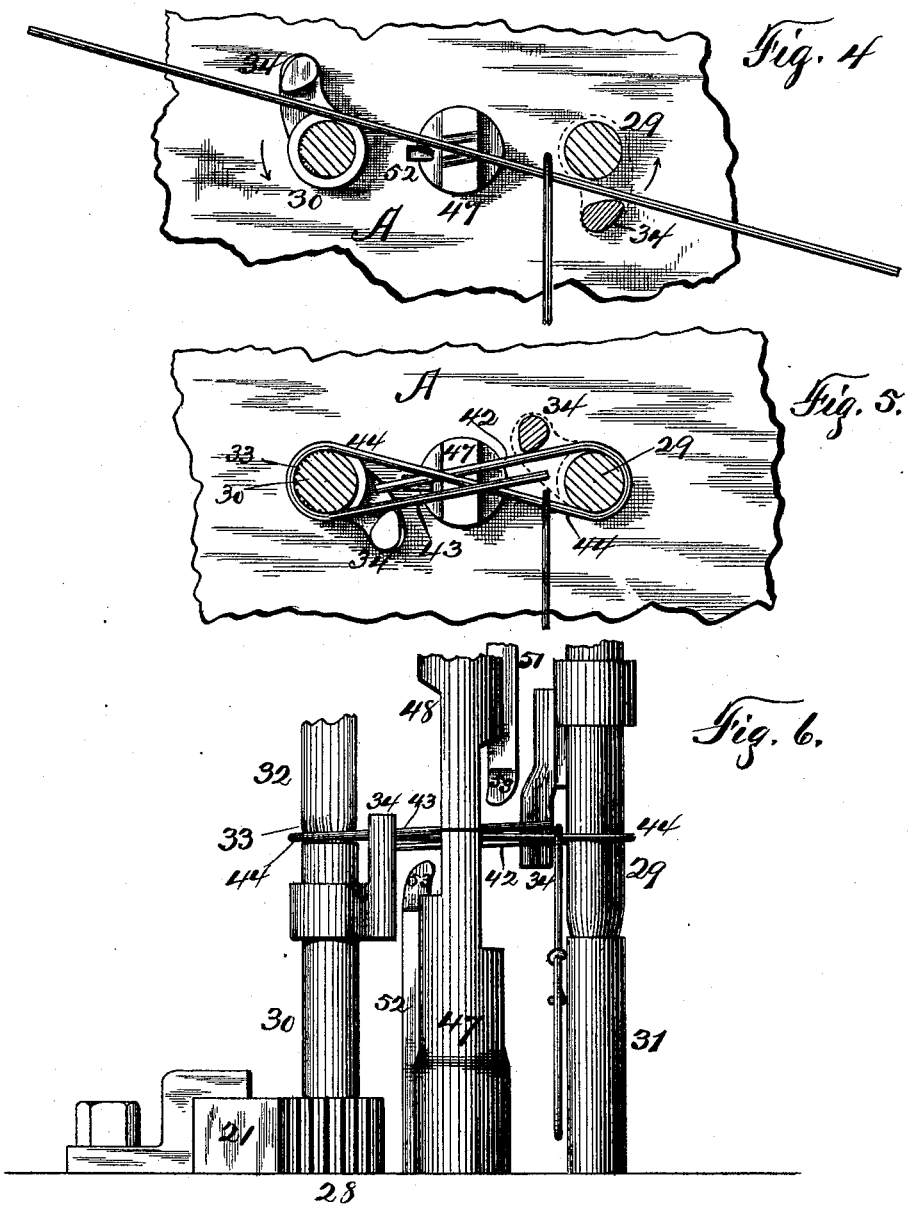
WITNESSES:
H. A. Carhart
H. E. Bates
INVENTOR,
Ferrand F. Ellis
BY
Smith & Denison
his ATTORNEYS (No Model.) 8 Sheets—Sheet 5.
F. F. ELLIS.
CHAIN MAKING MACHINE.
No. 484,909. Patented Oct. 25, 1892.
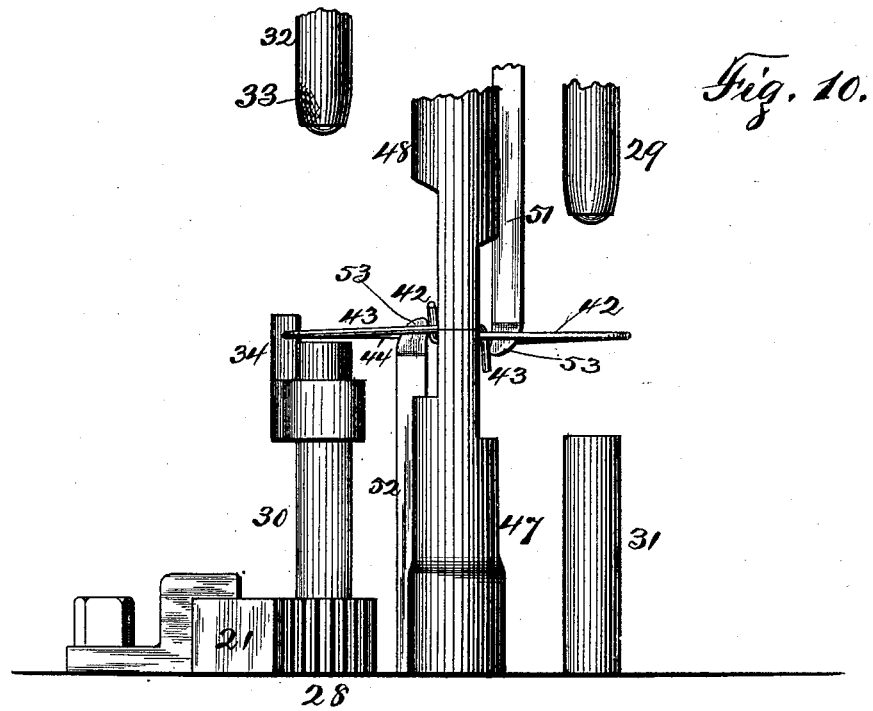
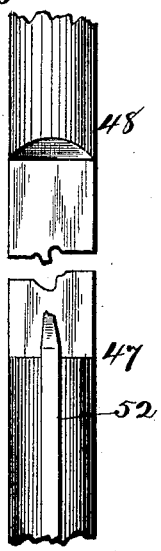
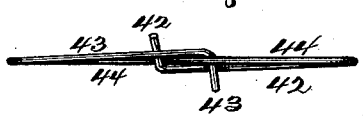
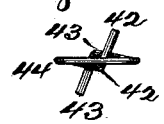
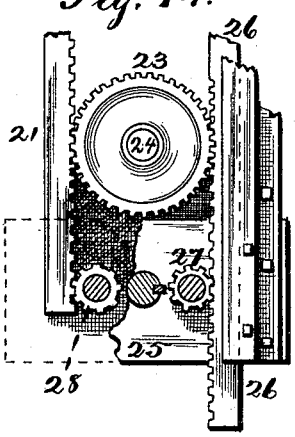
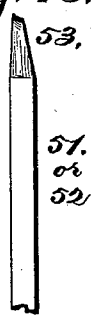
WITNESSES: INVENTOR,
H. A. Carhart Ferrand F. Ellis
H. E. V. Bailey BY
Smith & Denison
his ATTORNEY
THE NORRIS PETERS CO., PHOTO-LITHO., WASHINGTON, D. C.

(No Model.) 8 Sheets—Sheet 6.

F. F. ELLIS.
CHAIN MAKING MACHINE.

No. 484,909. Patented Oct. 25, 1892.

WITNESSES:
H. A. Carhart
H. E. Bialis

INVENTOR,
Ferrand F. Ellis
BY Smith & Denison
his ATTORNEYS

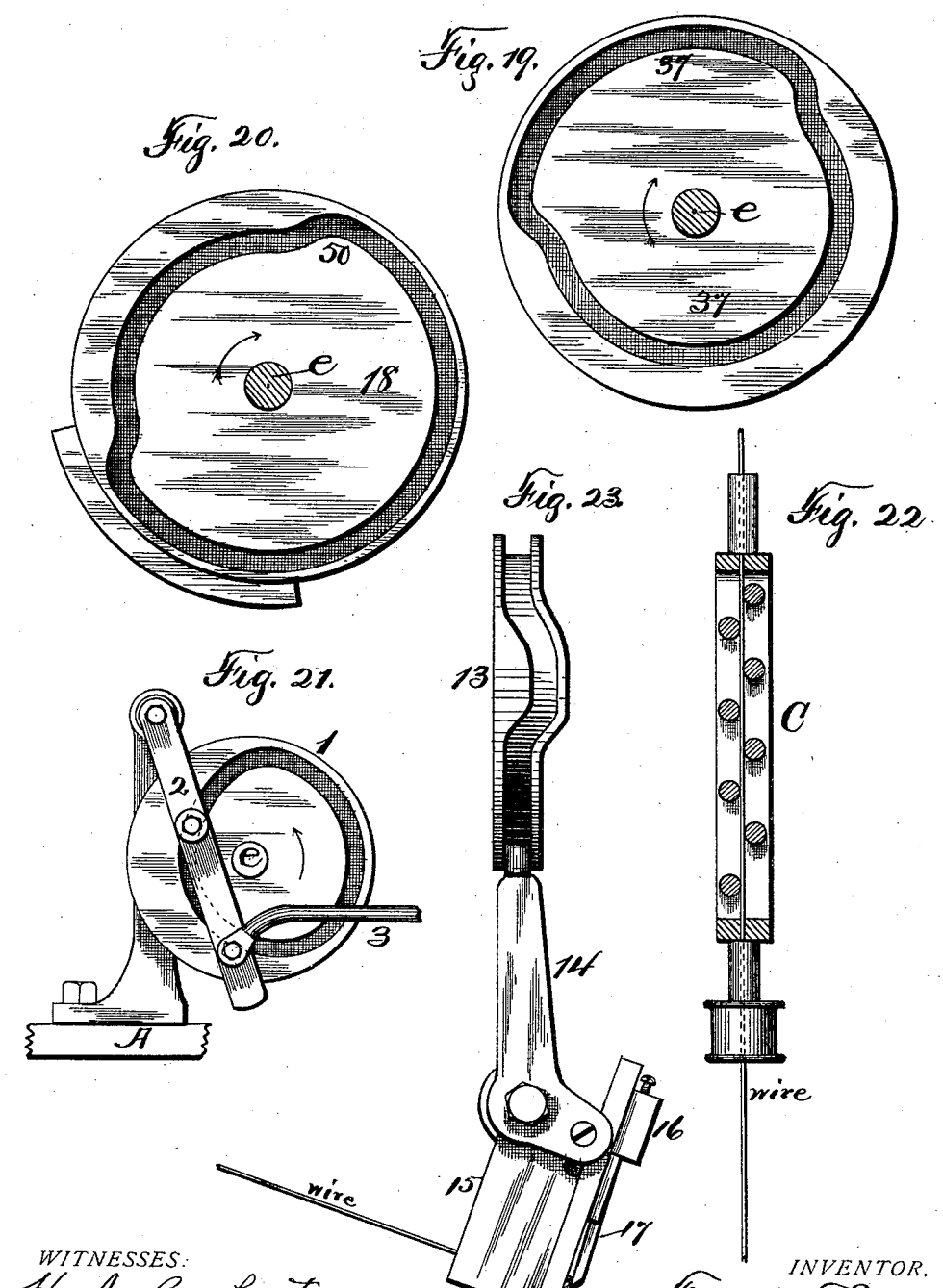

(No Model.) 8 Sheets—Sheet 8.

F. F. ELLIS.
CHAIN MAKING MACHINE.

No. 484,909. Patented Oct. 25, 1892.

WITNESSES:
H. A. Carhart
H. E. Scott

INVENTOR,
Ferrand F. Ellis
BY
Smith & Denison
his ATTORNEYS

UNITED STATES PATENT OFFICE.

FERRAND F. ELLIS, OF ONEIDA, ASSIGNOR TO THE ONEIDA COMMUNITY, LIMITED, OF KENWOOD, NEW YORK.

CHAIN-MAKING MACHINE.

SPECIFICATION forming part of Letters Patent No. 484,909, dated October 25, 1892.

Application filed February 3, 1892. Serial No. 420,143. (No model.)

*To all whom it may concern:*

Be it known that I, FERRAND F. ELLIS, of Oneida, in the county of Madison, in the State of New York, have invented new and useful Improvements in Chain-Making Machines, of which the following, taken in connection with the accompanying drawings, is a full, clear, and exact description.

My invention relates to machines for forming and continuously connecting the links of a chain from a coil of wire or rods of metal.

My object is to produce a machine embodying means for feeding and inserting the straight wire or rod through one eye of the previously-formed link or a ring, as at the end of a chain, then cutting it off to length, then simultaneously forming both eyes of the link by bending both ends inwardly toward each other, so that they cross the wire adjacent to its center and on opposite sides of it and lie substantially parallel with each other, then punching the free ends, one down and the other upward, through the eyes adjacent to the angles formed by their intersections at the middle of the link, and then clinching the bent ends around the wire adjacent to the intersections and on opposite sides thereof, each section of wire being held while the ends are bent over, and the incomplete link thereby formed being held at the same point while the free ends are punched through them and clinched, said machine being provided with means for feeding and straightening the wire as it is fed.

My invention consists in the several novel features of construction and operation hereinafter described, and which are specifically set forth in the claims hereunto annexed. It is constructed and operated as follows, reference being had to the accompanying drawings, in which—

Figure 16:
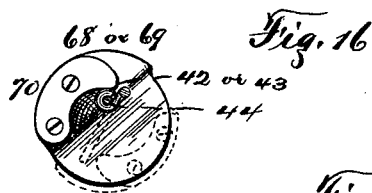
Figure 17:
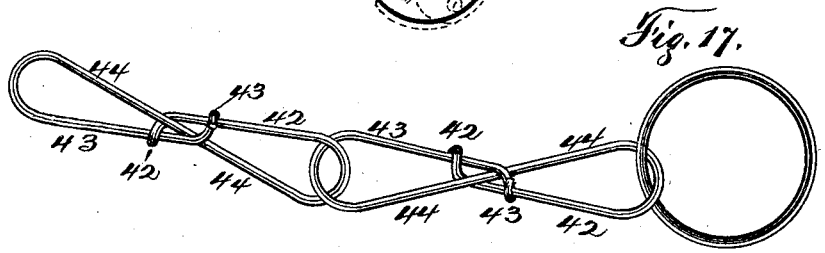
Figure 18:
Figure 24:
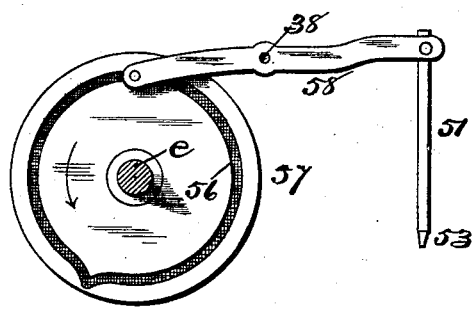
Figure 25:
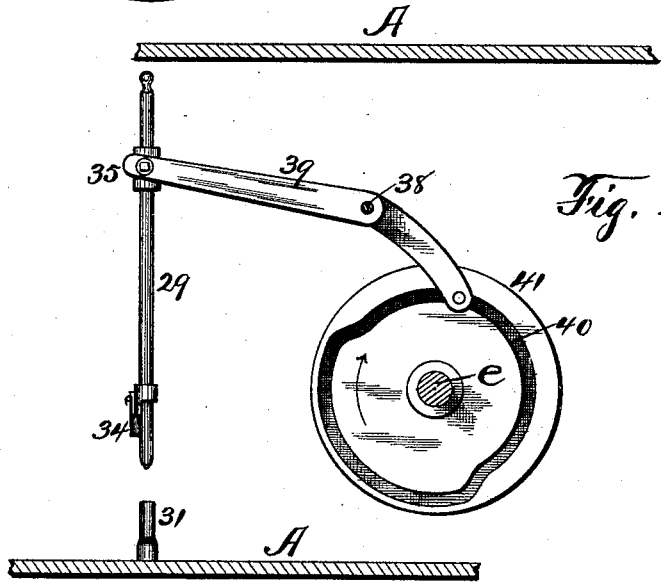
Figure 26:
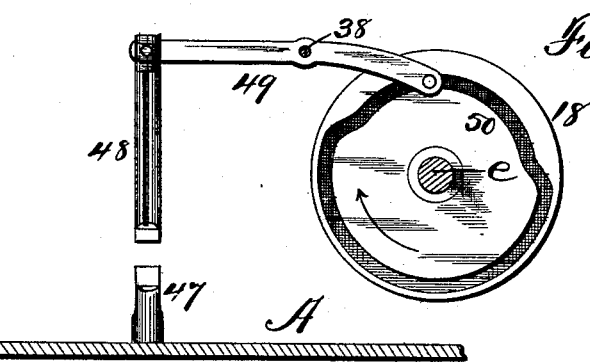

Figure 1 is a side elevation of the machine. Fig. 2 is a top plan thereof. Fig. 3 is a sectional front elevation, the table being cut transversely. Fig. 4 is an enlarged detail in top plan, showing the benders ready to bend around the ends of the wire-section to take the first step in the making of the link after the wire has been cut off to length. Fig. 5 is a like view of the same after the ends are bent to create the incomplete link. Fig. 6 is a front elevation of part of the bending mechanism with the incomplete link gripped by the gripping-jaws, the bending mechanism being in the same position as shown in Fig. 5. Fig. 7 is a detail of the mechanism for rotating the bending-arms. Fig. 8 is a detail of the cam mechanism for punching the free end of the bent link upward through the link-eye. Fig. 9 is a side elevation of the grip-jaws detached and separated from each other. Fig. 10 is a front elevation of part of the mechanism for punching the free ends through the eyes, showing the link gripped in the jaws and the ends pushed through and the benders retracted to their normal position. Figs. 11 and 12 are respectively side and end elevations of the link when completed as far as shown in Fig. 10. Fig. 13 is an edge view of one of said punches detached. Fig. 14 is a detail in top plan of the mechanism for rotating the benders. Fig. 15 shows the link in the jaws and the bent ends partly clinched down by wrapping around the wire. Fig. 16 is an end elevation of one of the rotating clinchers, showing in dotted lines the position of the wire end and the eccentric wrapping-cam when said cam is ready to begin its rotation, and by the full lines the same parts just as the wrapping or clinch is finished. Fig. 17 is a plan view of a ring and two links completed and connected. Fig. 18 is a front elevation of the wire-feed gears. Fig. 19 is a plan view of the cam which operates to raise and lower the bender. Fig. 20 is a plan view of the cam which operates the link-benders and by the camway therein operates the vertically-movable grip-jaw. Fig. 21 is a plan view of the cam mechanism which operates the feed mechanism. Fig. 22 is a plan view of the wire-straightener. Fig. 23 is a top plan view of the mechanism for cutting off the wire and the cam for operating the cutter. Fig. 24 is a detail of the cam mechanism for punching the free end of the bent link downward through the link-eye. Fig. 25 is a detail of the cam mechanism for operating the upper link-bender. Fig. 26 is a detail of the cam mechanism for operating the grip-jaw.

A is the bed or table of the machine, suitably supported upon legs, and *a* is the main drive-shaft, journaled in suitable bearings, and $b$ is the drive-pulley thereon, said shaft being provided with a pinion $c$, which meshes with the drive-gear $d$, mounted upon the main shaft $e$, which is journaled in suitable bearings upon said bed. Upon the extension B of the bed I mount the wire-straightener C, which is of ordinary construction, and as it is not a part of my invention is not herein specifically described, further than to say that it receives the wire from the coil, straightens it, and delivers it to the feed mechanism.

The feed mechanism is constructed and operated as follows: Upon the end of the shaft $e$ I secure a cam 1, Fig. 21, with which the lever 2 engages, and to which lever one end of the pitman 3 is connected, the other end being connected to the pawl-carrier 4, which is loose upon the vertical arbor 5 and carries the push-pawl 6. Upon the arbor 5 I mount loosely a horizontal ratchet 7, with which the pawl engages, a feed-disk 8, grooved in its periphery, Fig. 18, and a gear 9, all secured together, so that all are simultaneously rotated by the operation of said pawl. Upon another vertical arbor I mount loosely the grooved counter feed-disk 10 and a gear 11, said disk being contiguous to the disk 8, with their grooves coinciding, and the gears 9 and 11 are in mesh with each other, so that the rotation of the gear 9 by the pawl-and-ratchet mechanism rotates both gears and feed-disks, and correspondingly feeds the wire through between said disks, preferably into a stationary guide or support 12, through which it passes into the cut-off mechanism, of which, in fact, said guide is a member.

By reference to Figs. 2 and 23 it will be seen that the cut-off mechanism is constructed and operated as follows: Upon the shaft $e$ I secure a disk 13, provided with a camway-groove in its periphery, which receives the arm of the crank-lever 14, which is pivoted upon the block 15, erected and stationary upon the bed, and which is perforated horizontally to permit the wire to pass freely through it. A slide 16 is mounted in one side of said block and pivotally connected to the short-arm of said crank-lever 14, and the cut-off tool 17 is secured in said slide, and the cam vibration of said lever operates the said tool, which cuts off the wire to the desired length and leaves the so-cut-off link-wire section in position to be bent to form the incomplete link. This link-bending mechanism is constructed and operated as follows: Upon the shaft $e$ a cam 18 is secured, provided with a shoulder 19, Fig. 7, which is adapted to engage with a lug 20 upon the rack-bar 21, which lies in a guideway upon the top of the table and throws it forward. This movement of the rack-bar rotates the gears 22 and 23, which are secured upon and connected by the vertical shaft 24 and are alike. Upon suitable standards a second table 25 is supported above the table A, through which the shaft 24 extends, so that the gear 23 is on top thereof. Upon the table in Fig. 14, in a guideway I mount a sliding rack-bar 26, the counterpart of 21, with which the gear 23 is in engagement, so that when the lug 19 on the cam 18 engages with the shoulder 20 upon the rack-bar 21 and pushes it to the left, (in Fig. 7,) such movement will rotate the gears 22 and 23 and slide the rack-bar 26 in the opposite direction to the movement of the rack-bar 21, and the rack-bar 21 will rotate the pinion 27 in one direction while the rack-bar 26 will rotate the pinion 28 in the opposite direction. The pinion 27 is mounted upon a vertical mandrel 29 and bender, combined with a feather-way connection, so that the shaft is movable vertically therein. The pinion 28 is secured upon the bender 30, which is seated in the main table and adapted to rotate therein. A stationary pivot-block 31 is secured in the table directly below the shaft 29 and is concaved in its upper end to receive the convex lower end of the shaft. Above and in line with the upright 30 I mount in the table 25 a vertically-movable non-rotating mandrel 32, which is convex upon its lower end and fits into the concavity in the upper end of the shaft 30. (See Fig. 6.) Also, the lower end of the shaft 32 is corrugated, as at 33, Fig. 6, so as to slightly bite the wire. The winders 29 and 30, which bend the wire by their rotation, are each provided with an arm 34, offset from it and standing vertically parallel with it, and of a rounded or ovoid form in cross-section, as shown in Figs. 4 and 5. The winder 29 and mandrel 32 are secured in a head 35, Fig. 3, and are simultaneously operated vertically by means of the lever 36, adapted to engage with the camway, Fig. 19, in the face of the cam 37 and pivoted upon the rod 38, Fig. 2, and by the lever 39, pivoted upon the rod 38 and adapted to engage with a camway 40 in the cam 41, Fig. 25. This mechanism then operates as follows: The rotation of the cam 18 brings the shoulder 19 into engagement with the lug 20, pushing the rack-bar 21 forward and rotating the gears 22 and 23, which rotates the pinions 27 and 28, aided by the upper rack-bar 26. Just prior to this the link-wire section has been fed along into substantially the position shown in Fig. 4. Then the rotation of the cam 37 through the lever 36 and the rotation of the cam 41 through the lever 39 lowers the bending-mandrel 29 and non-rotating mandrel 32 down into respective engagement with the bender 30 and the pivot-block 31, bringing the link-wire between the respective bending arms and the mandrels, as shown in Fig. 4. Then the rotation of the pinions 27 and 28 rotates the shafts 29 and 30 and the engagement of the arms 34 with the wire bends its free ends around the mandrels until said ends (which for clearness I mark 42 and 43 and also mark the body of said wire between the end bends 44) cross the body, one above it and the other under it, as shown in Fig. 5. This forms the incomplete link, which is so far completed by the time when the front of the shoulder 19 slips onto the top of the lug 20 and the benders are held in the position shown in 5 and the link thereby retained there, while the periphery of the shoulder is passing over said lug and in close frictional contact therewith. While it is so held, the incomplete link is gripped without any change in its position, so as to be held for the succeeding steps. At about the time it is so gripped the shoulder 19 becomes wholly disengaged from the lug 20, which releases the rack-bar 21 and all of the mechanism actuated by its forward movement, as aforesaid, and then the cams and cam-levers raise the bender 29 and mandrel 32 out of the way, and then the spring 45, being connected by the rod 46, Fig. 2, to the rack-bar 21, having been compressed by the forward movement of said rack-bar, reacts and rotates the winders or benders back to their normal positions, as shown in Fig. 4.

The link-gripping and holding mechanism is constructed and operated as follows: The grip proper consists of two jaws 47 and 48, 47 being stationary upon the bed A and 48 being vertically movable in its mounting in the upper table 25, and above said table it is connected to a lever 49, which is pivoted upon the pivot-rod 38, and its rear end is in engagement with the camway 50 in the cam 18, by which cam and lever the jaws are brought together upon the intersections of the body and ends of the link, and it is then held therein until the link is finished. The jaw-pieces 47 and 48 are cut away on opposite sides, substantially as shown, the width of the end of each operating to regulate the distance between the ties formed by the free ends of the incomplete link, as hereinafter described. The upper end of the jaw 47 is grooved transversely, substantially as shown in Figs. 4 and 9, to receive the body 44 of the link and part of the ends 42 and 43, and the lower end of the jaw 48 is provided with a transverse rib and with grooves on each side of it, so that when the link is gripped both the body and ends are firmly held immovable. The next step in making the link is to punch or tuck the ends 42 43 through the inner ends of the eyes close to their intersections with the body, and this mechanism is constructed and operated as follows: The jaw-pieces 47 48 are grooved vertically on opposite sides, which grooves operate as the vertical guides for the punches or tuckers 51 and 52, the inner end of each being provided with a rounded and beveled point 53. The tucker 52 passes down through the bed and is there pivotally connected to a lever 54, pivotally mounted under the table, Fig. 8, and connected to a cam-rod 55, which is adapted to engage with the camway 56 in the face of the cam 57. The tucker 51 passes up through the table 25 and is there pivotally connected to a lever 58, pivoted upon the rod 38 and having its rear end adapted to engage with the camway 56 in the cam 57 on the opposite side from that shown in Fig. 8, but exactly like Fig. 8. This double connection of the cam-levers 54 and 58 to the cam causes the tuckers to operate simultaneously. When the incomplete link is gripped in the position shown in Figs. 5 and 6, the tucker 51, when operated, will force or tuck the end 42 down through the link-eye upon that end and the tucker 52 will tuck the end 43 up through the other eye, bending both close to the sides of the grip-jaw, as seen in Figs. 10 and 11; but neither end so bent will stand vertical to the plane of the link-eyes, but will be inclined, as shown in Fig. 12, such inclination being caused by the beveled point of each tucker.

The next step in the manufacture is the clinching of the points by wrapping each one around the opposite end—that is to say, the tucked point of the end 42 is wrapped around the end 43, and vice versa, which is done by the following mechanism: A cam 59 is mounted upon the shaft $e$, provided with a camway, as shown by the dotted lines, with which the lever 60 is adapted to engage, said lever being connected by the pitman 61 and crank-pin 62 to the disk 63, which is secured upon the shaft 64, Fig. 1. Upon this shaft I secure the gears 65, each of which engages with a pinion 66, each of which is secured upon a shaft 67, which are suitably journaled above the bed A, as shown in Fig. 3, and one of these shafts carries the wrapper 68 and the other the wrapper 69, each of which wrappers is eccentric to its shaft and which are cut away on one side, as shown, in order that they may better clear the other parts adjacent to their inner ends and the link-eyes also, and which are in the same vertical plane, but in parallel horizontal planes as to their inner ends, as shown in Fig. 3. The operation of the cam 59 is to cause these wrappers to oscillate or partially rotate, and when so rotated the cam 70 upon the end of each rolls and wraps the ends around and clinches them, as aforesaid, and as shown in Figs. 15 and 16. In the latter the dotted lines indicate this cam and a wire end at the starting-point and the full lines show the end wrapped or clinched and the cam in its position as the wrapping is finished. When the wrapping of the link is thus done, it is finished, and the wrappers are rotated back to their normal position.

A completed link is shown in Fig. 17. At the time when the link is thus completed the cam 18 has so rotated that the lever will raise the jaw 48 and release the link, which either falls upon the bed or is removed by hand.

My present machine contemplates the connection of a made link to a wire section of another link by hand, in that I hold a finished link in such a position that when the wire section is fed into place, as shown in Fig. 4, the wire will pass through one eye of the link. The notch 71 in the wrapper 68, Figs. 3 and 15, is cut therein to receive one side of the link and retain it in one position while the second link is being made, as shown in Figs. 5, 6, and 15. The ring in Fig. 17 is connected to the adjoining link in the same manner.

It will thus be seen that the eye-bending arms retire after forming the eyes; that the jaws grip the incomplete link and hold it until it is finished; that the tuckers retire after tucking the ends through the eyes, and that the clinching-wrappers retire after making the wrappings; that all of said mechanisms operate upon or concentric with a fixed common center, and that the link remains stationary in one place upon said center from the time when the eye-forming arms engage with the wire until it is fully completed.

What I claim as my invention, and desire to secure by Letters Patent, is—

1. In a chain-making machine, the combination of the vertical rotating shafts and the link-eye-forming arms secured thereon and parallel thereto and carried around by the rotation of said shafts, substantially as described, for the purposes set forth.

2. In a chain-making machine, a vertically-movable shaft provided with a link-eye-forming arm and supported above the table, in combination with another rotating vertical shaft erected upon the table and provided with a link-eye-forming arm, both shafts being in parallel vertical planes, and means to rotate both shafts simultaneously in opposite directions, substantially as and for the purposes set forth.

3. In a chain-making machine, the combination of a vertically-movable shaft and a link-eye-forming arm thereon with a rotating shaft and a link-eye-forming arm thereon, and means to rotate both shafts simultaneously in opposite directions and to return them to their normal positions, both shafts being at all times in parallel vertical planes, substantially as set forth.

4. In a chain-making machine, the combination of vertical rotating link-eye-forming arms and vertically-movable eye-forming mandrels, all erected and movable in parallel vertical planes, substantially as set forth.

5. In a chain-making machine, the combination of vertical rotating link-forming arms with vertically-movable eye-forming mandrels, one of which is provided with corrugations, said arms and mandrels being and operating in parallel vertical planes, substantially as set forth.

6. In a chain-making machine, the combination of a vertical rotating shaft and a link-forming arm mounted upon it, a conical pointed mandrel movable vertically into and out of engagement with said shaft, and a rotating mandrel-shaft conical-pointed and movable vertically into and out of engagement with a pivot-block, and a link-forming arm upon said mandrel, substantially as set forth.

7. In a chain-making machine, link-gripping jaws, one stationary and the other movable vertically and adapted to grip and hold the link after the eyes are formed until it is finished, a cam, and a pivotally-mounted lever connected to the movable jaw and engaging with said cam, in combination with vertical link-eye-forming mandrels and bending-arms parallel to said jaws, substantially as set forth.

8. In a chain-making machine, tuckers reciprocated vertically in opposite directions, a cam, and levers engaging therewith and connected to said tuckers, in combination with link-gripping jaws between the tuckers, substantially as set forth.

9. In a chain-making machine, tuckers reciprocated vertically in opposite directions and provided with beveled and rounded points, a cam, and levers engaging therewith and connected to said tuckers, in combination with link-gripping jaws between the tuckers, substantially as set forth.

10. In a chain-making machine, oscillating rotating wrappers and cams eccentric thereto upon their inner ends, engaging with the tucked ends of the incomplete link, in combination, and means for holding the blank while being bent, substantially as set forth.

11. In a chain-making machine, oscillating rotating wrappers mounted upon horizontally-journaled shafts and eccentric thereto, and means to rotate them forward in engagement with the tucked ends of the incomplete link and back out of engagement therewith, in combination.

12. In a chain-making machine, oscillating rotating wrappers mounted upon horizontally-journaled shafts and eccentric thereto, and cams upon their inner ends, and means to half rotate them forward in engagement with the tucked ends of the incomplete link and back out of engagement therewith, in combination.

13. In a chain-making machine, oscillating rotating wrappers and cams upon the inner ends thereof eccentric to their operating-shafts, one of said wrappers being provided with a notch 71, and means to half rotate them forward in engagement with the tucked ends of the incomplete link and back out of engagement therewith, in combination.

14. In a chain-making machine, the combination, with the forward-and-back rotated link-forming arms, of a stationary and a vertically-reciprocating jaw gripping the incomplete link.

15. In a chain-making machine, the combination, with a stationary and a reciprocating jaw, of vertically-reciprocating tuckers on opposite sides of said jaws.

16. In a chain-making machine, the combination, with a stationary and a reciprocating jaw, of vertically-reciprocating tuckers mounted in guideways upon opposite sides of said jaws.

17. In a chain-making machine, the combination, with the jaws for gripping the incomplete link, of reciprocating tuckers mounted in guides on opposite sides of said jaws and provided with beveled points.

18. In a chain-making machine, the combination, with the link-gripping jaws, of oscillating rotating wrappers on either side thereof and engaging with the tucked ends, the one above and the other below the plane of the link.

19. In a chain-making machine, the combination, with the link-gripping jaws, of oscillating rotating wrappers eccentric to the shafts by which they are carried and rotated and engaging with the tucked ends, the one above and the other below the plane of the link.

20. In a chain-making machine, the combination, with the link-gripping jaws, of oscillating rotating wrappers eccentric to the shafts by which they are carried and rotated, and cams upon their inner ends adjacent to said jaws.

21. In a chain-making machine, the combination, with the oscillating link-forming arms and the link-gripping jaws, of vertically-reciprocating tuckers mounted upon opposite sides of said jaws.

22. In a chain-making machine, the combination, with the oscillating link-forming arms, the link-gripping jaws, and the vertically-reciprocating tuckers, of the oscillating wrappers on either side of said jaws.

23. In a chain-making machine, central link-holding jaws, in combination with oscillating link-bending arms and vertically-reciprocating mandrels, vertically-reciprocating tuckers, and oscillating end wrappers.

24. In a chain-making machine, central link-holding jaws, in combination with oscillating reciprocating tuckers and oscillating end wrappers.

In witness whereof I have hereunto set my hand this 1st day of February, 1892.

FERRAND F. ELLIS.

In presence of—
C. W. SMITH,
HOWARD P. DENISON.